(12) United States Patent
Rubin

(10) Patent No.: US 12,728,719 B2
(45) Date of Patent: Sep. 8, 2026

(54) MECHANICAL COUPLING OF DUAL ELECTRIC MOTORS DRIVING A SINGLE VEHICLE AXLE

(71) Applicant: GM GLOBAL TECHNOLOGY OPERATIONS LLC, Detroit, MI (US)

(72) Inventor: Daniel Y. Rubin, Holon (IL)

(73) Assignee: GM Global Technology Operations LLC, Detroit, MI (US)

(*) Notice: Subject to any disclaimer, the term of this patent is extended or adjusted under 35 U.S.C. 154(b) by 561 days.

(21) Appl. No.: 18/319,139

(22) Filed: May 17, 2023

(65) Prior Publication Data

US 2024/0383330 A1 Nov. 21, 2024

(51) Int. Cl.
*B60K 23/04* (2006.01)
*B60K 1/02* (2006.01)

(52) U.S. Cl.
CPC ................ *B60K 23/04* (2013.01); *B60K 1/02* (2013.01); *B60K 2023/043* (2013.01)

(58) Field of Classification Search
CPC ..... B60K 23/04; B60K 1/02; B60K 2023/043
See application file for complete search history.

(56) References Cited

U.S. PATENT DOCUMENTS 11,312,352 B2 * 4/2022 Kaimer ................. B60L 15/025
2010/0025131 A1 * 2/2010 Gloceri .................... B60K 6/52 180/65.265
2013/0030636 A1 * 1/2013 Sugata ................. B60K 7/0007 701/22
2024/0262189 A1 * 8/2024 Hiereth ................ B60K 7/0007
2024/0286492 A1 * 8/2024 Takahashi ............... F16H 48/10

FOREIGN PATENT DOCUMENTS

EP 1642759 A1 * 4/2006 ............. B60L 50/51

* cited by examiner

*Primary Examiner* — John D Walters
(74) *Attorney, Agent, or Firm* — Quinn IP Law

(57) ABSTRACT

A dual electric motor coupling system for a vehicle including: a vehicle having a vehicle body and a first electric motor, a second electric motor, and a vehicle axle attached to the vehicle body. The vehicle axle including a first rotating member coupled to the first electric motor and connectable to a first wheel assembly of the vehicle, and a second rotating member coupled to the second electric motor and connectable to a second wheel assembly of the vehicle, wherein the first and second wheel assemblies, when connected to the first rotating member and second rotating member, respectively, are disposed on opposing ends of the vehicle axle. A mechanical coupling is disposed in relation to the first electric motor and the second electric motor and is operable to selectively couple the first electric motor and the second electric motor by providing a coupling torque to the vehicle axle.

20 Claims, 7 Drawing Sheets

12B
20B
$T_R$
18B
24B
32B
14B
Motor
$DT_2$
$GR_2$
34B
22B
$T_C$
34A
14A
Motor
$DT_1$
$GR_1$
32A
24A
18A
20A
$T_L$

MECHANICAL COUPLING OF DUAL ELECTRIC MOTORS DRIVING A SINGLE VEHICLE AXLE

INTRODUCTION

The present disclosure generally relates to mechanical couplings and, more particularly, to a mechanical coupling for a vehicle, which selectively couples two electric motors to drive a single vehicle axle.

An electric motor is a type of a machine that converts electric energy into mechanical energy. Electric motors may be configured as an alternating current (AC) or a direct current (DC) type. Electric motors operate through interacting magnetic fields and current-carrying conductors to generate force. The force generated by the electric motor may provide power to a vehicle axle. The vehicle axle may include, for example. a solid axle, a pair of half shafts, a pair of gear shafts, a pair of external shafts, and/or any pair of opposing rotating members disposed along a common axis of a vehicle with wheels disposed at opposing ends of the vehicle axle. The vehicle may include a hybrid electric vehicle having a combustion engine and/or an electric vehicle.

Some hybrid and/or electric vehicle configurations include a single electric motor that generates power to drive a pair of wheels, each of which is disposed at an opposing end of a vehicle axle. In this configuration, the power generated by the single electric motor to drive the vehicle axle is distributed and/or shared between the two wheels disposed at the opposing ends of the vehicle axle.

Other hybrid and/or electric vehicle configurations include a pair of electric motors or dual electric motors that are uncoupled from one another. That is, one of the electric motors generates power that drives one wheel disposed at one end of a single axle, while the other electric motor generates power that drives another wheel disposed at the opposing end of the same single axle. In this configuration, the power generated by both electric motors cannot be combined to provide a combined power to only one of the wheels, or provide a first portion of the combined power, which is greater than the power generated by only one electric motor, to one wheel, while providing a second portion of the combined power to the other wheel.

While the uncoupled dual electric motor configuration allows torque vectoring, which may improve vehicle handling, and wheel drive separation, which may improve split road-friction performance, the two electric motors are independent of one another, and, as such, both the torque vectoring and wheel drive separation capabilities are limited to the power generated by only one electric motor.

SUMMARY

It is therefore useful to develop a dual electric motor coupling system that selectively couples a pair of electric motors to one another to increase the power available to drive a vehicle axle. Selectively coupling a pair of electric motors may also increase the torque vectoring envelope, improve wheel drive separation for directional stability, and allow the vehicle to continue to be driven with only one electric motor.

Additionally, by selectively coupling a pair of electric motors, the two electric motors may be locked together allowing the power of both electric motors to be combined, resulting in a higher amount of torque available for distribution to a vehicle axle. This may be beneficial, for example, in an off-road or split road-friction situation, where one wheel may be off the ground or on a surface with poor traction. In these situations, a greater portion of the combined torque, or perhaps all of the combined torque, may be provided to the wheel that is in contact with the ground or to the wheel on the surface with better traction, resolving the situation.

According to one aspect of the present disclosure, a dual electric motor coupling system for a vehicle may include a vehicle having a vehicle body, a first electric motor attached to the vehicle body, a second electric motor attached to the vehicle body, and a vehicle axle attached to the vehicle body.

The vehicle axle may include a first rotating member coupled to with the first electric motor and connectable to a first wheel assembly of the vehicle, and a second rotating member coupled to the second electric motor and connectable to a second wheel assembly of the vehicle. Such that, the first- and second-wheel assemblies, when connected to the first rotating member and second rotating member, respectively, are disposed on opposing ends of the vehicle axle.

A mechanical coupling is disposed in relation to the first electric motor and the second electric motor, wherein the mechanical coupling is operable to selectively couple the first electric motor and the second electric motor and provide a coupling torque at the vehicle axle.

The first electric motor may be operable to generate a first drive torque, the second electric motor may be operable to generate a second drive torque. The mechanical coupling may selectively couple the first electric motor and the second electric motor to generate a combined drive force and, provide a combined torque to the first- and second-wheel assemblies when the first- and second-wheel assemblies are connected to the first and second rotating members, respectively.

The mechanical coupling may be operable to provide a first torque to the first rotating member, and a second torque to the second rotating member, The first torque may include the first drive torque transmitted by a first gear set plus the coupling torque. The second torque may include the second drive torque transmitted by a second gear set less the coupling torque.

The mechanical coupling may be operable to provide a first torque to the first wheel assembly, when the first wheel assembly is connected to the first rotating member, and a second torque to the second wheel assembly, when the second wheel assembly is connected to the second rotating member. The first torque may include the first drive torque transmitted by a first gear set less the coupling torque, and the second torque may include the second drive torque transmitted by a second gear set plus the coupling torque.

The mechanical coupling may provide a combined torque to one of the first wheel assembly, when the first wheel assembly is connected to the first rotating member and the second wheel assembly, when the second wheel assembly is connected to the second rotating member.

The mechanical coupling may provide variable coupling control between the first electric motor and the second electric motor. In one example, the mechanical coupling may include a clutch pack.

The mechanical coupling may provide on/off coupling control between the first electric motor and the second electric motor. In one example, the mechanical coupling may include a mechanical brake.

At least one of the first rotating member and the second rotating member may include a motor shaft, a gear shaft, or an external shaft.

According to another aspect of the present disclosure, a dual electric motor coupling system for a vehicle may include a first electric motor, operable to generate a first drive torque, a second electric motor, operable to generate a second drive torque, A mechanical coupling may be disposed in relation to the first electric motor and the second electric motor, such that the mechanical coupling may selectively couple the first electric motor and the second electric motor by providing a coupling torque to a vehicle axle, and a combined torque to first and second wheel assemblies connected to the vehicle axle.

According to another aspect of the present disclosure, a method of coupling dual electric motors in a vehicle may include: providing a vehicle having a vehicle body; attaching a first electric motor to the vehicle body, the first electric motor may be operable to generate a first drive torque; attaching a second electric motor to the vehicle body, the second electric motor may be operable to generate a second drive torque; providing a vehicle axle connectable to the vehicle body, the vehicle axle may include a first rotating member coupled to the first electric motor and connectable to a first wheel assembly, and a second rotating member coupled to the second electric motor and connectable to a second wheel assembly; and disposing a mechanical coupling in relation to the first electric motor and the second electric motor, such that the mechanical coupling may be operable to selectively couple the first electric motor and the second electric motor by providing a coupling torque to the vehicle axle.

The first electric motor and the second electric motor may be selectively coupled to generate a combined drive force and provide a combined torque to at least one of the first wheel assembly and second wheel assembly via the vehicle axle.

The method of coupling electric motors may include providing a first torque to the first wheel assembly, when the first wheel assembly is connected to the first rotating member; and providing a second torque to the second wheel assembly, when the second wheel assembly is connected to the second rotating member, such that the combined torque includes the first torque and the second torque.

One of the first torque provided and the second torque provided may be greater than the other of the first torque provided and the second torque provided.

The method of coupling electric motors may include providing the coupling torque to one of the first rotating member and the second rotating member, such that one of the first torque and the second torque is zero.

The mechanical coupling may selectively provide variable coupling control between the first electric motor and the second electric motor.

The mechanical coupling may selectively provide on/off coupling control between the first electric motor and the second electric motor.

Accordingly, the presently disclosed dual electric motor coupling system for a vehicle provides a mechanical coupling that may increase a total drive torque provided to an axle of the vehicle, and allow for torque vectoring, which may improve handling, and wheel drive separation, which may improve split-friction coefficient performance.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and, together with the description, serve to explain the principles of the disclosure.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Figure 1:
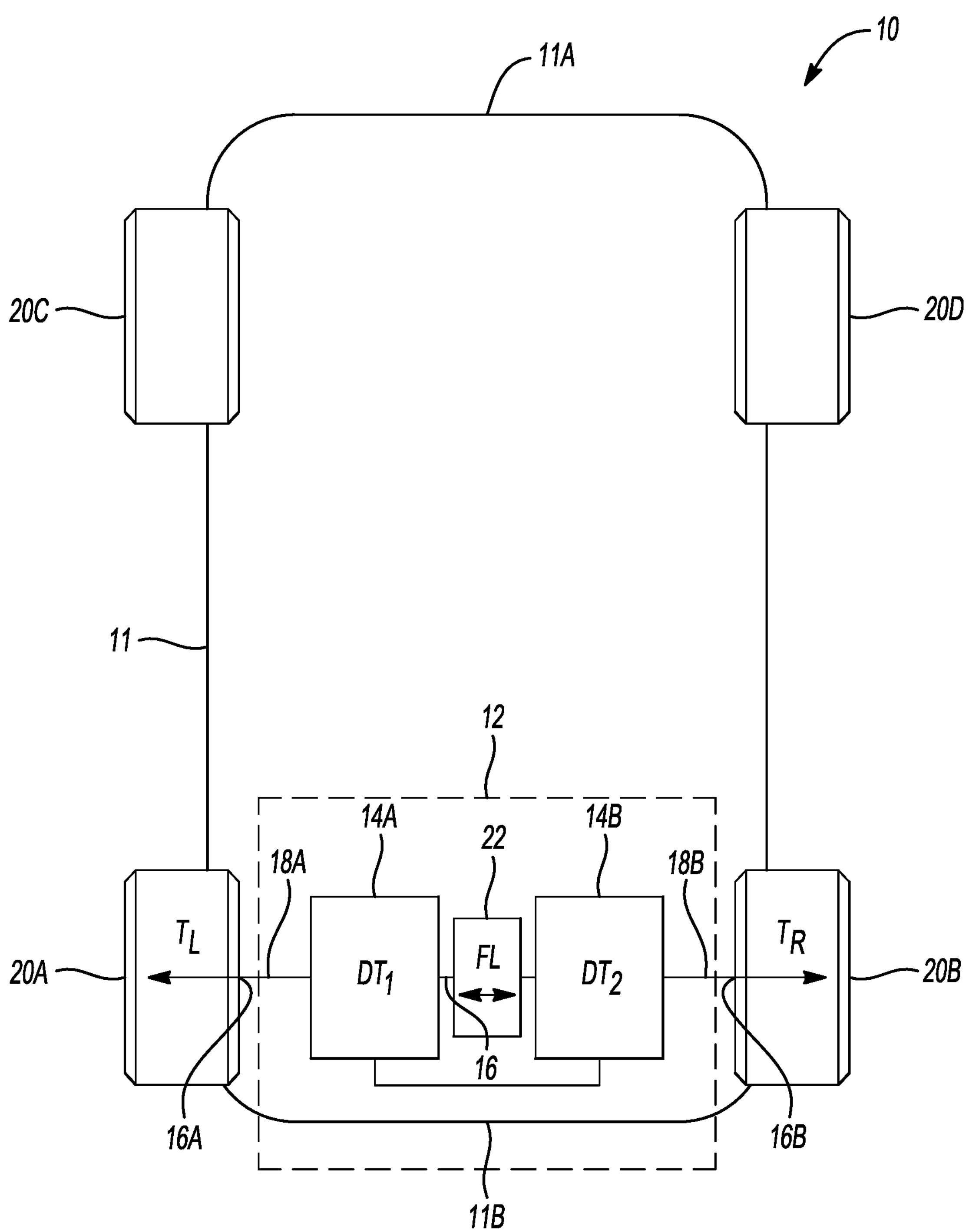
FIG. 1 is a schematic illustration of a vehicle including a dual electric motor coupling system in accordance with the present disclosure.

With reference to FIG. 1, a vehicle 10, having a vehicle body 11, includes a dual electric motor coupling system, schematically illustrated at 12, disposed within the vehicle body 11. The dual electric motor coupling system 12 includes a first electric motor 14A and a second electric motor 14B, which are attached to the vehicle body 11. A rear vehicle axle 16, attached to the vehicle body 11, includes a first rotating member 18A and a second rotating member 18B, opposite the first rotating member 18A.

It should be appreciated that, as illustrated in FIGS. 3A-D, the first rotating member 18A and the second rotating member 18B may include, but are not limited to, opposing external shafts (FIG. 3A), opposing motor shafts (FIG. 3B), and/or opposing gear shafts (FIG. 3C-D), as required based on vehicle packaging constraints.

A first wheel assembly 20A and a second wheel assembly 20B are disposed, respectively, at opposing ends 16A, 16B of the rear vehicle axle 16, and connectable, respectively, to the opposing ends 16A, 16B of the vehicle axle 16.

The first electric motor 14A is operable to generate a first drive torque $DT_1$. The second electric motor 14B is operable to generate a second drive torque $DT_2$.

A mechanical coupling 22, disposed in relation to the first electric motor 14A and the second electric motor 14B, is operable to selectively couple the first electric motor 14A and the second electric motor 14B to generate a friction (or coupling) load FL, which provides a friction (or coupling) torque $T_C$ to the rear vehicle axle 16.

Figure 2:
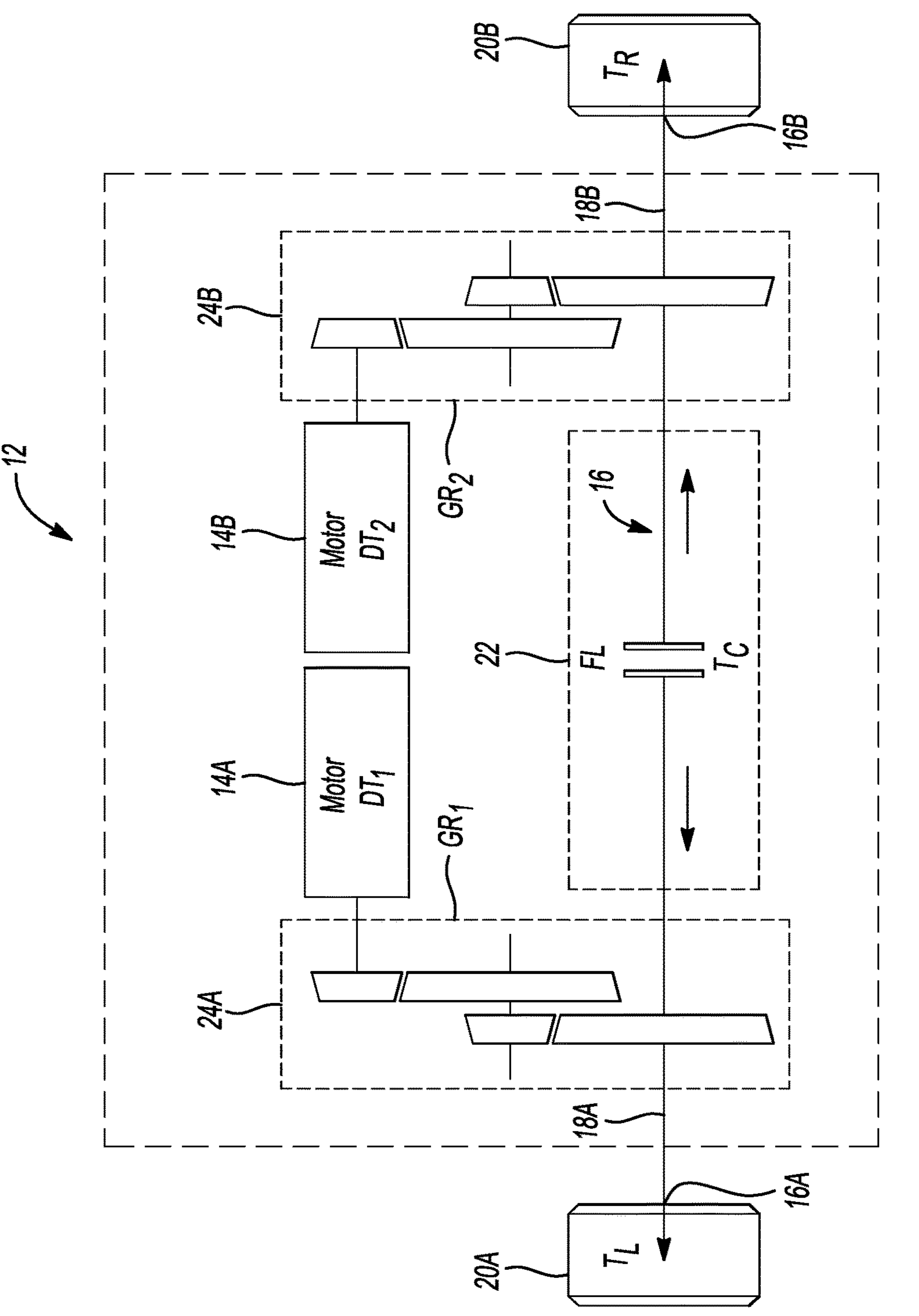
FIG. 2 is a schematic illustration of a dual electric motor coupling system in accordance with the present disclosure.

The first rotating member 18A is coupled to the first electric motor 14A and connected to the first wheel assembly 20A via, for example, a first set of gears 24A having a first gear ratio $GR_1$ (FIG. 2). The second rotating member 18B is coupled to the second electric motor 14B and connected to the second wheel assembly 20B via, for example, a second set of gears 24B having a second gear ratio $GR_2$ (FIG. 2).

When the first electric motor 14A is coupled to the second electric motor 14B, the coupling torque $T_C$ is provided to the rear vehicle axle 16, a first torque $T_L$ is provided to the first wheel assembly 20A, and a second torque $T_R$ is provided to the second wheel assembly 20B.

The first torque $T_L$ is equal to the first drive torque $DT_1$ generated by the first electric motor 14A, multiplied by a first gear ratio $GR_1$ of the first set of gears 24A, plus the coupling torque $T_C$. The second torque $T_R$ is equal to the second drive torque $DT_2$ generated by the second electric motor 14B, multiplied by a second gear ratio $GR_2$ of the second set of gears 24B, less the coupling torque $T_C$.

While the dual electric motor coupling system 12 is illustrated at a rear end portion 11B of the vehicle body 11 to selectively couple the first electric motor 14A and the second electric motor 14B, and provide the coupling torque $T_C$ to the rear vehicle axle 16 including first and second wheel assemblies 20A, 20B, it should be appreciated that the dual electric motor coupling system 12 may be disposed at a front end portion 11A of the vehicle body 11, to selectively couple the first electric motor 14A and the second electric motor 14B, and provide the coupling torque $T_C$ at a front vehicle axle (not shown) including third and fourth wheel assemblies 20C, 20D.

It should also be appreciated that a vehicle 10 may include more than one dual electric motor coupling system 12. For example, a vehicle 10 may include a dual electric motor coupling system 12 associated with a rear vehicle axle 16 disposed at the rear end portion 11B of the vehicle body 11, and another dual electric motor coupling system 12 associated with a front vehicle axle (not shown) disposed at a front-end portion 11A of the vehicle body 11.

It should also be appreciated that, a vehicle 10 having more than two axles may include a separate dual electric motor coupling system 12 associated with one of the axles, each of the axles, and/or any combination of the axles up to and including all of the axles.

As illustrated in FIG. 2, with continued reference to FIG. 1, a dual electric motor coupling system 12 includes a mechanical coupling 22, disposed in relation to a first electric motor 14A and a second electric motor 14B.

A rear vehicle axle 16 includes a first rotating member 18A and a second rotating member 18B. The first rotating member 18A is coupled to the first electric motor 14A via, for example, a first set of gears 24A having a first gear ratio $GR_1$, and connectable to a first wheel assembly 20A. The second rotating member 18B is coupled to the second electric motor 14B via, for example, a second set of gears 24B having a second gear ratio $GR_2$, and connectable to a second wheel assembly 20B.

A mechanical coupling 22, disposed in relation to the first electric motor 14A and the second electric motor 14B, is operable to selectively couple the first electric motor 14A and the second electric motor 14B to generate a friction (or coupling) load FL, which provides a coupling torque $T_C$ to the rear vehicle axle 16, which acts in opposite directions on the first and second rotating members 18A, 18B, including the first and second wheel assemblies 20A, 20B, respectively.

The first rotating member 18A is coupled to the first electric motor 14A via, for example, a first set of gears 24A having a first gear ratio $GR_1$, and connectable to the first wheel assembly 20A. The second rotating member 18B is coupled to the second electric motor 14B via, for example, a second set of gears 24B having a second gear ratio $GR_2$, and connectable to the second wheel assembly 20B.

The first electric motor 14A is operable to generate a first drive torque $DT_1$ and the second electric motor 14B is operable to generate a second drive torque $DT_2$. The mechanical coupling 22 is operable to selectively couple the first electric motor 14A and the second electric motor 14B to generate a friction (or coupling) load FL, which provides a coupling torque $T_C$ to the vehicle axle 16, which acts in opposite directions on the first and second rotating members 18A, 18B.

A first torque $T_L$ includes the first drive torque $DT_1$ generated by the first electric motor 14A and transmitted via the first gear set 24A having a first gear ratio $GR_1$ plus the coupling torque $T_C$. The first torque $T_L$ is provided to the first wheel assembly 20A via the first rotating member 18A.

A second torque $T_R$ includes the second drive torque $DT_2$ generated by the second electric motor 14B and transmitted by the second gear set 24B having a second gear ratio $GR_2$ less the coupling torque $T_C$. The second torque $T_R$ is provided to the second wheel assembly 20B via the second rotating member 18B.

The mechanical coupling 22 may include, but is not limited to, a clutch pack or a mechanical brake. Engaging a clutch pack creates a friction (or coupling) torque $T_C$, which acts to decrease a speed difference between the first and second rotating members 18A, 18B, in a matter similar to a limited slip differential (LSD). Engaging a mechanical brake creates a friction (or coupling) torque $T_C$, which prevents relative rotation between the first and second rotating members 18A, 18B, in a manner similar to a locking differential (LD).

It should be appreciated that, as illustrated in FIGS. 3A-D, a mechanical coupling 22 is disposed in relation to a first electric motor 14A and a second electric motor 14B. A first rotating member 18A and a second rotating member 18B may include, but are not limited to, opposing external shafts (FIG. 3A), opposing motor shafts (FIG. 3B), and/or opposing gear shafts (FIG. 3C-D), as required based on vehicle packaging constraints.

Figure 3A:
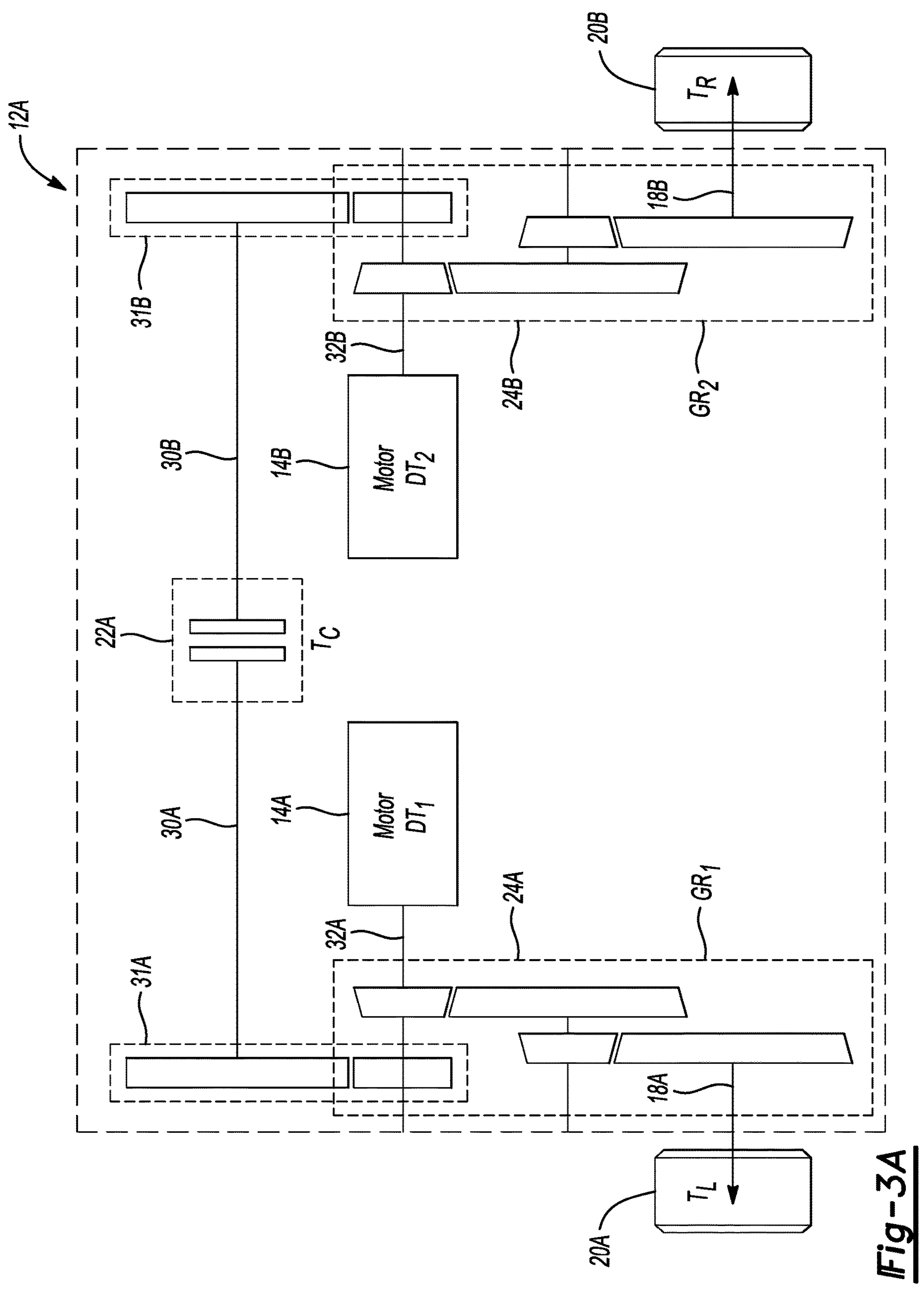
FIG. 3A is a schematic illustration of a dual electric motor coupling system in accordance with the present disclosure including a pair of external shafts.

As illustrated in FIG. 3A, a dual electric motor coupling system 12A includes a mechanical coupling 22A that is operable to selectively couple a first electric motor 14A and a second electric motor 14B, and provide a coupling torque $T_C$ to a pair of external shafts 30A, 30B. Each external shaft 30A, 30B includes an external gear set 31A, 31B, in engagement with first and second gear sets 24A, 24B, to provide first and second torques $T_R$, $T_L$ to first- and second-wheel assemblies 20A, 20B, as illustrated in FIG. 2.

Figure 3B:
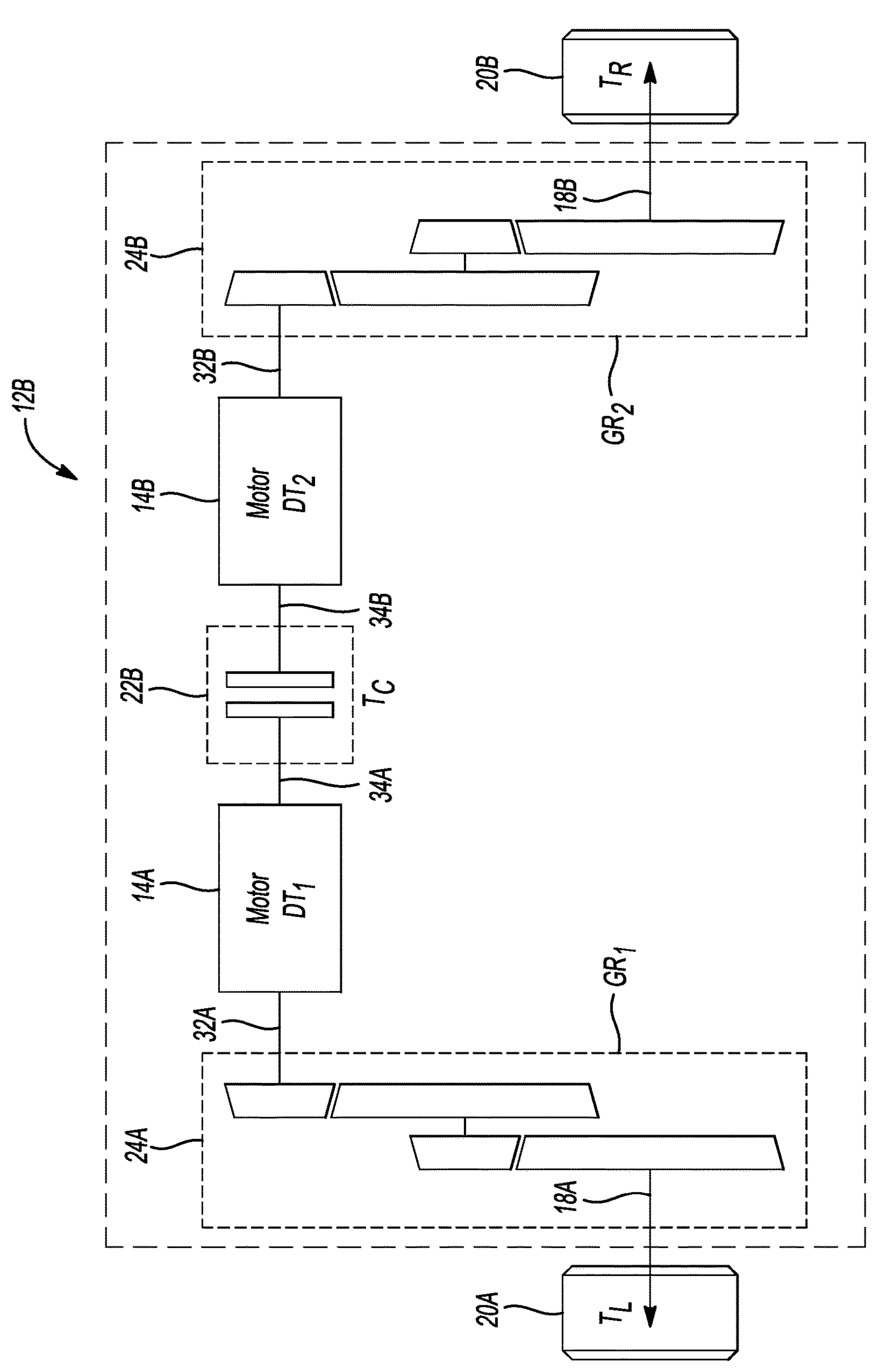
FIG. 3B is a schematic illustration of a dual electric motor coupling system in accordance with the present disclosure including a pair of motor shafts.

As illustrated in FIG. 3B, a dual electric motor coupling system 12B includes a mechanical coupling 22B that is operable to selectively couple a first electric motor 14A and a second electric motor 14B, and provide a coupling torque $T_C$ to a pair of motor shafts 32A, 32B. Each motor shaft 32A, 32B provides first and second torques $T_R$, $T_L$ to first- and second-wheel assemblies 20A, 20B via first and second gear sets 24A, 24B, as illustrated in FIG. 2.

Figure 3C:
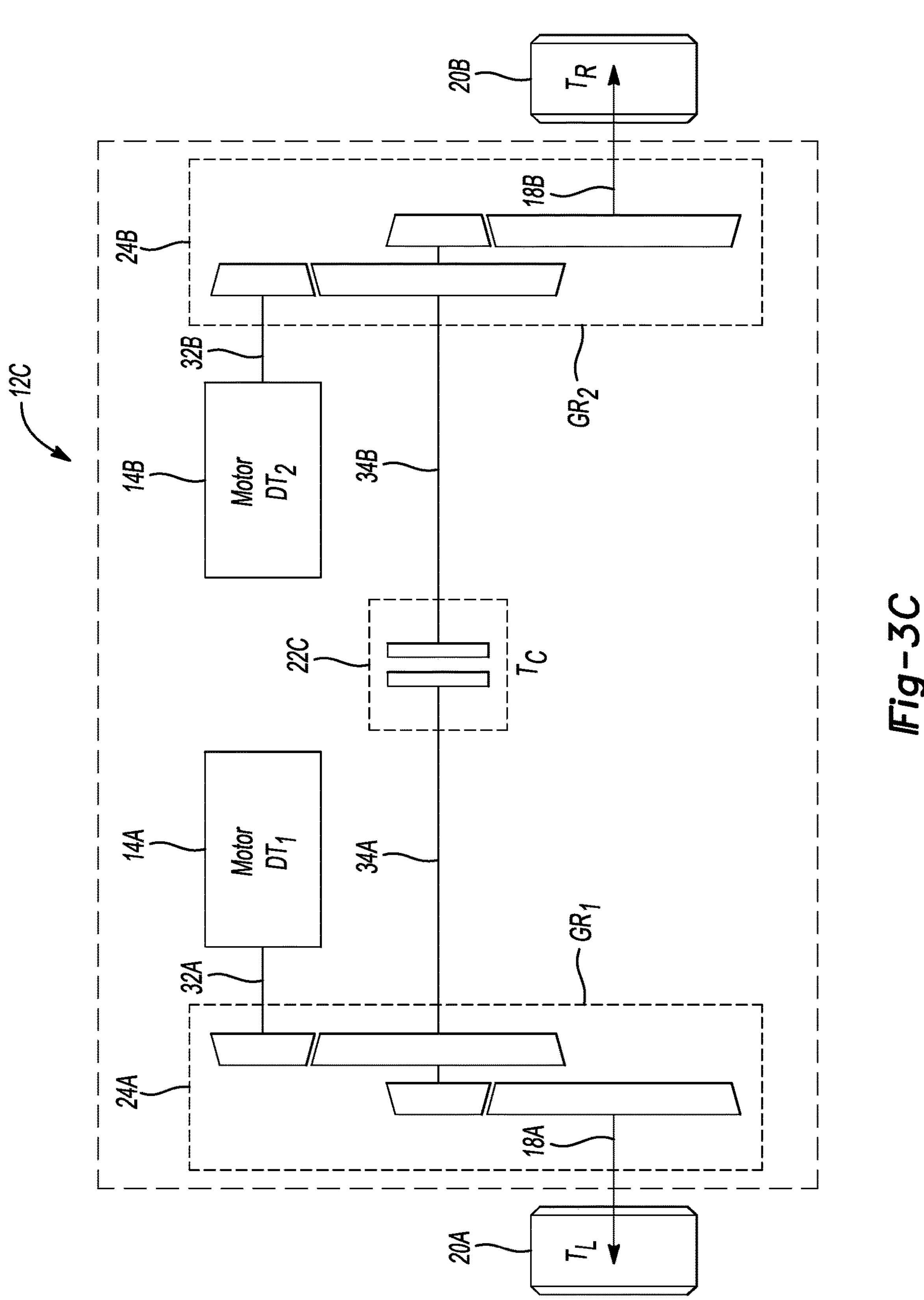
FIG. 3C is a schematic illustration of a dual electric motor coupling system in accordance with the present disclosure including a pair of gear shafts.

As illustrated in FIG. 3C, a dual electric motor coupling system 12C includes a mechanical coupling 22C that is operable to selectively couple a first electric motor 14A and a second electric motor 14B, and provide a coupling torque $T_C$ to a pair of gear shafts 34A, 34B. Each gear shaft 34A, 34B provides first and second torques $T_R$, $T_L$ to first- and second-wheel assemblies 20A, 20B via first and second gear sets 24A, 24B, as illustrated in FIG. 2.

Figure 3D:
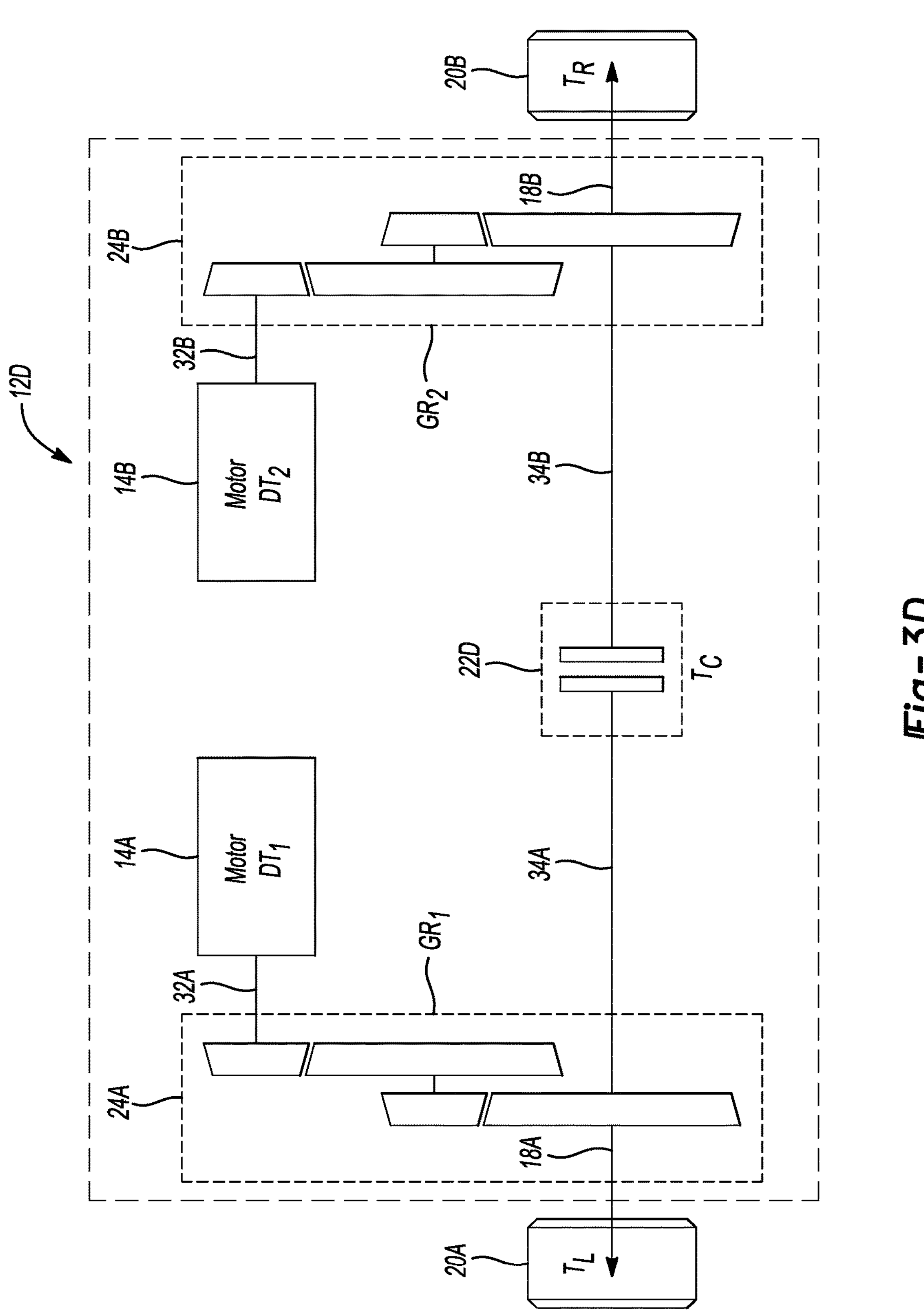
FIG. 3D is a schematic illustration of a dual electric motor coupling system in accordance with the present disclosure including a pair of gear shafts.
Figure 4:
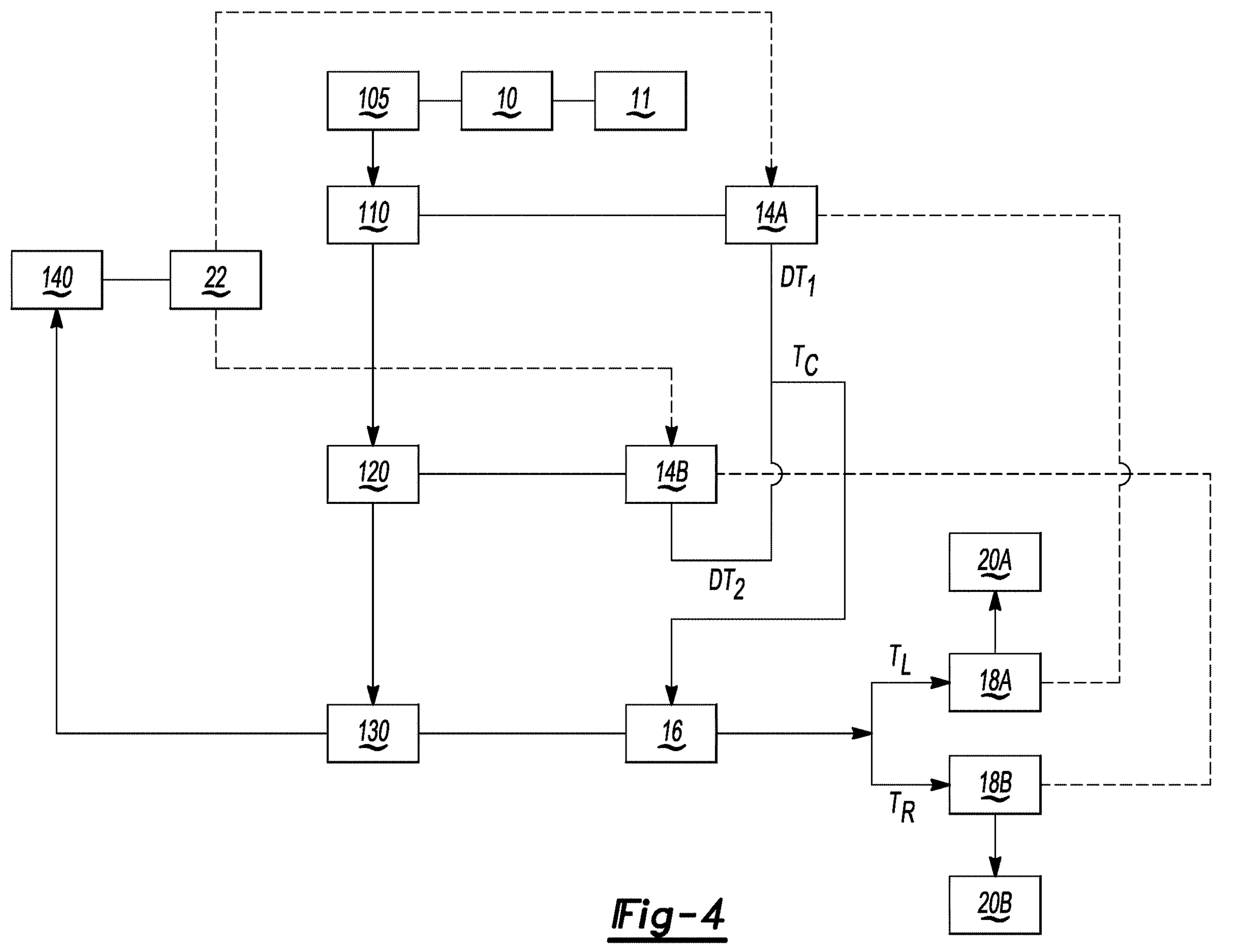
FIG. 4 is a flow chart illustrating a method of coupling dual electric motors in accordance with the present disclosure.

As illustrated in FIG. 3D, a dual electric motor coupling system 12D includes a mechanical coupling 22D that is operable to selectively couple a first electric motor 14A and a second electric motor 14B, and provide a coupling torque $T_C$ to a pair of half shafts 36A, 36B. Each half shaft 36A, 36B provides first and second torques $T_R$, $T_L$ to first- and second-wheel assemblies 20A, 20B via first and second gear sets 24A, 24B, as illustrated in FIG. 2.

In one example embodiment of the present disclosure, the first torque $T_L$ may be greater than the second torque $T_R$ provided, respectively, to the first wheel assembly 20A and second wheel assembly 20B or, the second torque $T_R$ may be greater than first torque $T_L$ provided, respectively, to the second wheel assembly 20B and the first wheel assembly 20A.

In another example embodiment according to the present disclosure, the mechanical coupling 22 provides a friction (or coupling) torque $T_C$, which is equal in magnitude to either the first torque $T_L$, which is equal to the first drive torque $DT_1$ generated by the first electric motor 14A and transmitted via the first gear set 24A to the first rotating member 18A, or the second torque $T_R$, which is equal to the second drive torque $DT_2$ generated by the second electric motor 14B and transmitted via the second gear set 24B to the second rotating member 18B. Such that, either the first torque $T_L$ is equal to zero and the second torque $T_R$ is equal to the first drive torque $DT_1$ generated by the first electric motor 14A plus the second drive torque $DT_2$ generated by the second electric motor 14B, or the first torque $T_L$ is equal to the first drive torque $DT_1$ generated by the first electric motor 14A plus the second drive torque $DT_2$ generated by the second electric motor 14B and the second drive torque $T_R$ is equal to zero, for example, when gear ratio $GR_1$ and $GR_2$ (FIG. 2) are both 1:1.

In one example embodiment, the mechanical coupling 22 may provide variable coupling control of the first electric motor 14A and the second electric motor 14B. The mechanical coupling 22 may include, for example, a clutch pack that may be electrically controlled, and which applies a coupling torque $T_C$ from zero (no coupling) to a predetermined (positive) limit, similar to a limited slip differential (LSD).

In another example embodiment, the mechanical coupling 22 may provide on/off coupling control of the first electric motor 14A and the second electric motor 14B. The mechanical coupling 22 may include, for example, a mechanical brake, which applies a coupling torque $T_C$ that prevents relative rotation between the first and second rotating members 18A. 18B, similar to a locking differential (LD).

At least one of the first rotating member 18A and the second rotating member 18B may include, for example, a motor shaft, a gear shaft, and/or an external shaft.

According to another aspect of the present disclosure, a vehicle 10 having a vehicle body 11 includes a dual electric motor coupling system, schematically illustrated at 12, disposed within the vehicle body 11. The dual electric motor coupling system 12 includes a first electric motor 14A, operable to generate a first drive torque $DT_1$, a second electric motor 14B, operable to generate a second drive torque $DT_2$, and a mechanical coupling 22 disposed in relation to the first electric motor 14A and the second electric motor 14B, such that the mechanical coupling 22 selectively couples the first electric motor 14A and the second electric motor 14B by providing a coupling torque $T_C$ to a rear vehicle axle 16, and a combined torque to a first and second wheel assemblies 20A, 20B connected to the rear vehicle axle 16.

According to another aspect of the present disclosure, a method 100 of coupling 110 dual electric motors 14A, 14B in a vehicle 10 may include: providing 105 a vehicle having a vehicle body 11; attaching 110 a first electric motor 14A to the vehicle body 11, the first electric motor 14A operable to generate a first drive torque $DT_1$; attaching 120 a second electric motor 14B to the vehicle body 11, the second electric motor 14B operable to generate a second drive torque $DT_2$; providing 130 a rear vehicle axle 16 including: a first rotating member 18A couplable to the first electric motor 14A, and connectable to a first wheel assembly 20A of the vehicle 10; and a second rotating member 18B couplable to the second electric motor 14B, and connectable to a second wheel assembly 20B of the vehicle 10; and disposing 140 a mechanical coupling 22 in relation to the first electric motor 14A and the second electric motor 14B, wherein the mechanical coupling 22 is operable to selectively couple the first electric motor 14A and the second electric motor 14B by providing a coupling torque $T_C$ to the rear vehicle axle 16.

The first electric motor 14A and the second electric motor 14B may be selectively coupled to generate a friction (or coupling) load FL and provide a combined torque $T_L+T_R$ to the first- and second-wheel assemblies 20A, 20B via the rear vehicle axle 16.

The method 100 of coupling dual electric motors 14A, 14B in a vehicle 10 may include providing a first torque $T_L$ to a first wheel assembly 20A, when the first wheel assembly 20A is connected to a first rotating member 18A; and providing a second torque $T_R$ to a second wheel assembly 20B, when the second wheel assembly 20B is connected to a second rotating member 18B. The first torque $T_L$ plus the second torque $T_R$ equals a combined torque $T_L+T_R$.

One of the first torque $T_L$ provided and the second torque $T_R$ provided may be greater than the other of the first torque $T_L$ provided and the second torque $T_R$ provided.

The method 100 of coupling dual electric motors 14A, 14B in a vehicle 10 may include providing the combined torque $T_L+T_R$ to one of a first rotating member 18A and a second rotating member 18B, such that one of the first torque $T_L$ or the second torque $T_R$ is zero.

The mechanical coupling 22 may selectively provide variable coupling control of the first electric motor 14A and the second electric motor 14B. For example, when the mechanical coupling 22 is clutch pack, which may be electrically controlled.

The mechanical coupling 22 may selectively provide on/off coupling control of the first electric motor 14A and the second electric motor 14B. For example, when the mechanical coupling 22 is a mechanical brake.

It should be appreciated that by utilizing the disclosed dual electric motor coupling system to selectively couple two electric motors, for example, in a split road-friction situation, the mechanical coupling 22 selectively couples the electric motors 14A, 14B, providing a greater portion of the combined torque $T_L+T_R$ to the wheel on the side of the vehicle 10 that has better traction.

It should also be appreciated that by utilizing the disclosed dual electric motor coupling system to selectively couple two electric motors, the combined torque $T_L+T_R$ can be split between the two wheels on a single axle as required based on road and/or driving conditions, which may improve torque vectoring. These improvements may include an ability to maintain the torque vectoring capability of a standard (non-coupled) dual electric motor unit without a speed difference, to provide torque vectoring during coasting and braking without requiring braking regeneration, and to increase torque vectoring from a faster wheel to a slower wheel by 100%.

It should also be appreciated that in a standard dual electric motor unit, without coupling, when torque vectoring is greater, in absolute value, than a torque requested by a driver, a drive torque at one of the electric motors may be negative. In order to produce negative torque. the electric motor is braking, i.e., regenerating energy, which may be used to produce energy that may be used to charge a vehicle battery.

It should also be appreciated that by utilizing the disclosed dual electric motor coupling system to selectively couple two electric motors, directional stability may be improved at straight-line launch, which may result in improved 0-60 performance, and at high speed, which may mitigate excessive steering sensitivity.

As used herein, a system, apparatus, structure, article, element, component, or hardware "configured to" perform a specified function is indeed capable of performing the specified function without alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to", "operative to" and/or as being "operable to" perform that function.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. A dual electric motor coupling system for a vehicle, comprising:

a vehicle having a vehicle body;

a first electric motor attached to the vehicle body;

a second electric motor attached to the vehicle body; and a vehicle axle attached to the vehicle body, the vehicle axle including:

a first rotating member coupled to with the first electric motor and connectable to a first wheel assembly of the vehicle; and a second rotating member coupled to the second electric motor and connectable to a second wheel assembly of the vehicle, wherein the first- and second-wheel assemblies, when connected to the first rotating member and second rotating member, respectively, are disposed on opposing ends of the vehicle axle; and a mechanical coupling disposed in relation to the first electric motor and the second electric motor, wherein the mechanical coupling is operable to selectively couple the first electric motor and the second electric motor and provide a coupling torque to the vehicle axle, and wherein the mechanical coupling includes:

a pair of external shafts;

a first gear set; and a second gear set, wherein each of the pair of external shafts includes an external gear set in engagement with the first gear set and the second gear set, respectively.

2. The dual electric motor coupling system as recited in claim 1, wherein the first electric motor is operable to generate a first drive torque, the second electric motor is operable to generate a second drive torque; and wherein the mechanical coupling selectively couples the first electric motor and the second electric motor to generate a combined drive force and, provide a combined torque to the first- and second-wheel assemblies when the first- and second-wheel assemblies are connected to the first and second rotating members, respectively.

3. The dual electric motor coupling system as recited in claim 2, wherein the mechanical coupling is operable to provide a first torque to the first rotating member, and a second torque to the second rotating member, and wherein the first torque includes the first drive torque transmitted by a first gear set plus the coupling torque, and the second torque includes the second drive torque transmitted by a second gear set less the coupling torque.

4. The dual electric motor coupling system as recited in claim 2, wherein the mechanical coupling is operable to provide a first torque to the first wheel assembly, when the first wheel assembly is connected to the first rotating member, and a second torque to the second wheel assembly, when the second wheel assembly is connected to the second rotating member, and wherein the first torque includes the first drive torque transmitted by a first gear set less the coupling torque, and the second torque includes the second drive torque transmitted by a second gear set plus the coupling torque.

5. The dual electric motor coupling system as recited in claim 2, wherein the mechanical coupling provides a combined torque to one of the first wheel assembly, when the first wheel assembly is connected to the first rotating member and the second wheel assembly, when the second wheel assembly is connected to the second rotating member.

6. The dual electric motor coupling system as recited in claim 1, wherein the mechanical coupling provides variable coupling control between the first electric motor and the second electric motor.

7. The dual electric motor coupling system as recited in claim 1, wherein the mechanical coupling provides on/off coupling control between the first electric motor and the second electric motor.

8. The dual electric motor coupling system as recited in claim 1, wherein the mechanical coupling includes a clutch pack.

9. The dual electric motor coupling system as recited in claim 1, where in the mechanical coupling includes a mechanical brake.

10. The dual electric motor coupling system as recited in claim 1, wherein at least one of the first rotating member and the second rotating member includes a motor shaft.

11. The dual electric motor coupling system as recited in claim 1, wherein the first gear set is coupled to the first rotating member, and the second gear set is coupled to the second rotating member, and wherein the external gear sets in engagement with the first gear set and second gear set, respectively, provide a first torque and a second torque to first- and second-wheel assemblies, respectively.

12. A dual electric motor coupling system for a vehicle, comprising:

a first electric motor, operable to generate a first drive torque;

a second electric motor, operable to generate a second drive torque; and a mechanical coupling disposed in relation to the first electric motor and the second electric motor, wherein the mechanical coupling includes:

a pair of external shafts;

a first gear set; and a second gear set, wherein each of the pair of external shafts includes an external gear set in engagement with the first gear set and the second gear set, respectively; and wherein the mechanical coupling selectively couples the first electric motor and the second electric motor by providing:

a coupling torque to a vehicle axle, and a combined torque to first- and second-wheel assemblies connected to the vehicle axle.

13. The dual electric motor coupling system as recited in claim 12, further including a first rotating member coupled to the first gear set, and a second rotating member coupled to the second gear set, and wherein the external gear sets in engagement with the first gear set and second gear set, respectively, provide the first torque and the second torque to first- and second-wheel assemblies, respectively.

14. A method of coupling dual electric motors in a vehicle, comprising:

providing a vehicle having a vehicle body;

attaching a first electric motor to the vehicle body, the first electric motor operable to generate a first drive torque;

attaching a second electric motor to the vehicle body, the second electric motor operable to generate a second drive torque;

providing a vehicle axle connectable to the vehicle body including:

a first rotating member coupled to the first electric motor and connectable to a first wheel assembly; and a second rotating member coupled to the second electric motor and connectable to a second wheel assembly; and disposing a mechanical coupling in relation to the first electric motor and the second electric motor, wherein the mechanical coupling is operable to selectively couple the first electric motor and the second electric motor by providing a coupling torque to the vehicle axle, and wherein the mechanical coupling includes:

a pair of external shafts;

a first gear set; and a second gear set, wherein each of the pair of external shafts includes an external gear set in engagement with the first gear set and the second gear set, respectively.

15. The method of coupling electric motors in a vehicle as recited in claim 14, wherein the first electric motor and the second electric motor are selectively coupled to generate a combined drive force and provide a combined torque to at least one of the first wheel assembly and second wheel assembly via the vehicle axle.

16. The method of coupling electric motors in a vehicle as recited in claim 15, including:

providing a first torque to the first wheel assembly, when the first wheel assembly is connected to the first rotating member; and providing a second torque to the second wheel assembly, when the second wheel assembly is connected to the second rotating member, wherein the combined torque includes the first torque and the second torque.

17. The method of coupling electric motors in a vehicle as recited in claim 16, wherein one of the first torque provided and the second torque provided is greater than the other of the first torque provided and the second torque provided.

18. The method of coupling electric motors as recited in claim 15, including:

providing the coupling torque to one of the first rotating member and the second rotating member, wherein one of the first torque and the second torque is zero.

19. The method of coupling electric motors in a vehicle as recited in claim 15, wherein the mechanical coupling selectively provides variable coupling control between the first electric motor and the second electric motor.

20. The method of coupling electric motors in a vehicle as recited in claim 15, wherein the mechanical coupling selectively provides on/off coupling control between the first electric motor and the second electric motor.

* * * * *